United States Patent [19]

Kramer et al.

[11] Patent Number: 5,596,068
[45] Date of Patent: Jan. 21, 1997

[54] POLYESTER RESIN FOR PRODUCING ARTICLES HAVING HIGH TRANSPARENCY AND A NEUTRAL COLOR

[75] Inventors: Wolfgang Kramer, Herdecke; Wilhelm Wüllscheidt, Bottrop; Theodor Jürgens, Castrop; Klaus Kleinecke, Kamen; Rudolf Geier, Essen, all of Germany

[73] Assignee: John Brown Deutsche Engineering GmbH, Essen, Germany

[21] Appl. No.: 373,233

[22] PCT Filed: Jun. 25, 1993

[86] PCT No.: PCT/DE93/00565

§ 371 Date: Feb. 14, 1995

§ 102(e) Date: Feb. 14, 1995

[87] PCT Pub. No.: WO94/01482

PCT Pub. Date: Jan. 20, 1994

[30] Foreign Application Priority Data

Jul. 7, 1992 [DE] Germany .......................... 42 22 244.3
Jun. 8, 1993 [DE] Germany .......................... 43 19 008.1

[51] Int. Cl.⁶ ................................................. C08G 63/78
[52] U.S. Cl. .......................... 528/280; 528/275; 528/283; 528/285; 528/286; 528/302; 528/307; 528/308; 528/308.6; 524/706; 524/710; 524/777; 524/783; 524/784; 524/785

[58] Field of Search ....................... 528/275, 280, 528/283, 285, 286, 302, 307, 308, 308.6; 524/706, 710, 777, 783, 784, 785

[56] References Cited

U.S. PATENT DOCUMENTS 4,440,924 4/1984 Kuze et al. .............................. 528/275
5,254,288 10/1993 Verheijen et al. ...................... 252/518

FOREIGN PATENT DOCUMENTS 63-139725 6/1988 Japan .
4-304228 10/1992 Japan .

OTHER PUBLICATIONS

CA:81(8); 38136j.
Nakanishi et al. "Poly(ethylene terephthalate)", 04/18, 2398.

*Primary Examiner*—Samuel A. Acquah
*Attorney, Agent, or Firm*—Herbert Dubno

[57] ABSTRACT

The invention relates to a polyester resin for producing a thick-walled bottles having high transparency and a neutral color. The polyester resin, containing at least one antimony compound, one germanium compound and one phosphorus compound, is produced by reacting a dicarboxylic acid with polyhydric alcohols and also contains cyclohexane dimentanol. The polyhydric alcohols are a mixture of ethylene glycol and at least 0.5% cyclohexane dimethanol. The result, more particularly, is a low rate of crystallization for obtaining thick-walled hollow members.

4 Claims, No Drawings

5,596,068

POLYESTER RESIN FOR PRODUCING ARTICLES HAVING HIGH TRANSPARENCY AND A NEUTRAL COLOR

CROSS REFERENCE TO RELATED APPLICATIONS

This application is a national phase of PCT/DE93/00565 filed 25 Jun. 1993 and published as WO94/01482 20 Jan. 1994 based upon German national Applications P42 22 244.3 of 7 Jun. 1992 and P43 19 008.1 of 8 Jun. 1993, under the International Convention.

FIELD OF THE INVENTION

Our present invention relates to a polyester resin for producing objects having high transparency and neutral color and containing one or more catalysts in the form of at least one antimony compound and one phosphorus compound, the polyester resin being produced by reacting a dicarboxylic acid with polyhydric alcohols.

BACKGROUND OF THE INVENTION

In a known polyester resin of this kind, the antimony compound is antimony glycolate, a cobalt compound present in the system is cobalt acetate, the phosphorus compound is phosphoric acid, the dicarboxylic acid is terephthalic acid and the polyhydric alcohol is a glycol, namely ethylene. The known polyester resin is used for producing containers, particularly bottles. However these are inevitably relatively thin-walled containers or bottles, because a high rate of crystallization has to be allowed for. Thin walled containers or bottles are throwaway containers or bottles, since they cannot be cleaned sufficiently frequently. Frequent cleaning, as required for containers intended for reuse sufficiently often, especially bottles, quickly results in damage to the thin-walled containers or thin-walled bottles. Examples of thin-walled containers or bottles. Examples of thin-walled containers or bottles are 1.5 liter containers or bottles weighing only 54 g. This is where the invention applies.

OBJECT OF THE INVENTION

It is an object of the invention to provide a polyester resin of the kind described, suitable for producing re-usable hollow members, particularly containers and bottles having adequate wall thickness.

SUMMARY OF THE INVENTION

According to the invention, a polyester resin as previously described additionally contains a germanium compound and cyclohexane dimethanol (CHDM) and the polyhydric alcohols are a mixture of ethylene glycol and at least 0.5% cyclohexane dimethanol.

The composition of the invention is a polyester resin, which, in addition to high transparency and a neutral color, has good resistance to heating and, particularly, a low rate of crystallization. For this reason, the polyester according to the invention can be used to make thick-walled hollow members, especially thick-walled containers or thick-walled bottles which can be re-used often, since they can be frequently cleaned without being damaged in the process. The resistance to heating, particularly the low rate of crystallization, are surprising and result from the presence of a combination of cyclohexane dimethanol and the catalyst. In this connection, according to the invention, the polyester resin can also contain a tin compound. Also the polyester resin can contain a potassium compound and/or a cobalt compound. Admittedly it is known to use cyclohexane dimethanol as comonomer in the production of polyethylene terephthalate, but this does not appreciably affect the problem and solution on which the invention is based.

SPECIFIC DESCRIPTION AND EXAMPLES

Other inventive features are set out hereinafter. The carboxylic acid used can be terephthalic acid or isophthalic acid or a mixture of the two. A polyester resin having optimum high transparency, neutral color, resistance to heating and a low rate of crystallisation, is characterized in that the polyester resins contains 0.5–15% by weight CHDM,
50–350 ppm of the antimony compound,
1–125 ppm of the cobalt compound
1–125 ppm of the phosphorus compound in each case relative to in terms of the active component (Sb, Co, or P). In this connection according to the invention, the polyester resin also contains a germanium compound, e.g. in an amount of 1–100 ppm, preferably 10 ppm, measured as elemental germanium.

The invention also relates to a hollow member, more particularly a thick-walled hollow member, manufactured from a polyester resin. In a preferred embodiment of the invention the hollow member or hollow container is a thick-walled bottle.

The formulation for a 100 kg batch is as follows:

| Pure terephthalic acid (PTA) | 86.2 kg |
| Ethylene glycol (EG) | 38.5 kg |
| Cyclohexane dimethanol (CHDM) | 2.0 kg |
| $Sb_2O_3$ | 320 ppm |
| Cobalt acetate | 55 ppm |
| Triethyl phosphate (TEP) | 90 ppm |
| $GeO_2$ | 15 ppm |

Esterification was brought about at 1.5 bar pressure (superatmospheric) in accordance with the following program, initially using a small quantity of bis(β-hydroxyethyl) terephthalate:

| Time min | HIM Temp. C. | Prod. Temp C. | Pressure, bar | Notes |
|---|---|---|---|---|
| 0 | 285 | 260 | 0 | Beginning of addition of PTA slurry |
| 5 | 285 | 245 | 1.5 | Pressure builds up |
| 60 | 285 | 245 | 1.5 | |
| 120 | 285 | 245 | 1.5 | Start of pressure/ temperature/ program |
| 160 | 280 | 250 | 0 | Addition of additive |
| 170 | 250 | 260 | 0 | Transfer |

Polycondensation was brought about as follows:

| Time min | HIM Temp, C. | Prod. Temp C. | Pressure, mbar | Notes |
|---|---|---|---|---|
| 0 | 285 | 260 | 1000 | Start |
| 15 | 290 | 290 | 230 | |
| 60 | 305 | 290 | 0.1 | |
| 140 | 290 | 292 | 0.1 | Beginning of granulation |

The resulting polyester resin is characterized by an intrinsic viscosity of 0.65 dl/g, a carboxyl terminal group content of 27 mval/kg, a melting-point of 252° C. and a color value CIE b* of 0.02 and can be recondensed without difficulty (solid state polycondensation) and converted into thick-walled hollow members. A thick-walled hollow member according to the invention is e.g. a 1.5-liter container or a 1.5-liter bottle weighing 104 g.

What is claimed is:

1. A batch formulation for esterification to produce a polyester resin in a fabrication of a container of high transparency and a neutral color, said formulation consisting essentially of a dicarboxylic acid esterifiable with a mixture of ethylene glycol and cyclohexandimethanol in the presence of an antimony compound and a phosphorous compound as catalysts and in the presence of a germanium compound, and wherein said formulation, said cyclohexandimethanol is present in an amount of 0.5 to 15 percent by weight, said antimony compound is present in an amount of 50 to 350 ppm in terms of antimony, said germanium compound is present in an amount of 1 to 100 ppm in terms of germanium, and said phosphorous compound is present in an amount of 1 to 125 ppm in terms of phosphorous.

2. The batch formulation defined in claim 1 wherein said dicarboxylic acid is terephthalic acid, isophthalic acid or a mixture of terephthalic and isophthalic acids.

3. The batch formulation defined in claim 2 wherein the formulation also contains at least one of a cobalt compound, a tin compound and a potassium compound.

4. The batch formulation defined in claim 3 wherein for 100 kg of polyester resin, said formulation consists of 86,2 kg terephthalic acid, 38.5 kg ethylene glycol, 2.0 kg of cyclohexanedimethanol, 320 ppm $Sb_2O_3$, 55 ppm cobalt acetate, 90 ppm triethyl phosphate and 15 ppm $GeO_2$.

* * * * *